US010360162B2

(12) United States Patent
McCarthy et al.

(10) Patent No.: US 10,360,162 B2
(45) Date of Patent: *Jul. 23, 2019

(54) PROCESSING SYSTEMS AND METHODS FOR TRANSITIONING BETWEEN PRIVILEGE STATES BASED ON AN ADDRESS OF A NEXT INSTRUCTION TO BE FETCHED

(71) Applicant: NXP USA, Inc., Austin, TX (US)

(72) Inventors: Daniel M. McCarthy, Phoenix, AZ (US); Joseph C. Circello, Phoenix, AZ (US); Kristen A. Hausman, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,910

(22) Filed: May 3, 2017

(65) Prior Publication Data
US 2017/0242803 A1    Aug. 24, 2017

Related U.S. Application Data

(63) Continuation of application No. 13/485,078, filed on May 31, 2012, now Pat. No. 9,672,164.

(51) Int. Cl.
G06F 9/30    (2018.01)
G06F 9/32    (2018.01)
(Continued)

(52) U.S. Cl.
CPC ...... *G06F 12/1491* (2013.01); *G06F 9/30181* (2013.01); *G06F 9/30189* (2013.01);
(Continued)

(58) Field of Classification Search
CPC ................ G06F 12/1491; G06F 9/30189
See application file for complete search history.

(56) References Cited

U.S. PATENT DOCUMENTS 5,513,337 A    4/1996    Gillespie et al.
6,282,657 B1    8/2001    Kaplan et al.
(Continued)

FOREIGN PATENT DOCUMENTS

CN    1954302 A    4/2007
CN    101281459 A    10/2008
(Continued)

OTHER PUBLICATIONS

Interrupts Traps and Exceptions Chapter 17, Oct. 10 2004, 33 pages, [retrieved from the internet on Jul. 6, 2017], retrieved from URL <https://web.archive.org/web/20041020010558/http://www.planetpdf.com:80/codecuts/pdfs/aoa.pdf>.*
(Continued)

*Primary Examiner* — Jyoti Mehta
(74) *Attorney, Agent, or Firm* — Sherry W. Schumm

(57) ABSTRACT

Embodiments include processing systems that determine, based on an instruction address range indicator stored in a first register, whether a next instruction fetch address corresponds to a location within a first memory region associated with a current privilege state or within a second memory region associated with a different privilege state. When the next instruction fetch address is not within the first memory region, the next instruction is allowed to be fetched only when a transition to the different privilege state is legal. In a further embodiment, when a data access address is generated for an instruction, a determination is made, based on a data address range indicator stored in a second register, whether access to a memory location corresponding to the data access address is allowed. The access is allowed when the current privilege state is a privilege state in which access to the memory location is allowed.

14 Claims, 4 Drawing Sheets

(51) Int. Cl.
*G06F 9/38* (2018.01)
*G06F 12/02* (2006.01)
*G06F 12/14* (2006.01)

(52) U.S. Cl.
CPC ............ *G06F 9/321* (2013.01); *G06F 9/3802* (2013.01); *G06F 9/3804* (2013.01); *G06F 12/023* (2013.01); *G06F 12/1441* (2013.01); *G06F 2212/1044* (2013.01); *G06F 2212/1052* (2013.01)

(56) References Cited

U.S. PATENT DOCUMENTS

| | | | |
|---|---|---|---|
| 6,516,395 B1 | 2/2003 | Christie | |
| 6,598,050 B1 | 7/2003 | Bourekas | |
| 7,380,106 B1* | 5/2008 | Bilski | G06F 9/3004 712/225 |
| 7,380,276 B2 | 5/2008 | Saha et al. | |
| 8,010,772 B2 | 8/2011 | Kershaw et al. | |
| 2002/0099933 A1 | 7/2002 | Nevill et al. | |
| 2004/0122834 A1* | 6/2004 | Durrant | G06F 9/4425 |
| 2005/0257016 A1 | 11/2005 | Boles et al. | |
| 2005/0268075 A1 | 12/2005 | Caprioli et al. | |
| 2007/0055803 A1* | 3/2007 | Fuchs | G06F 11/0745 710/107 |
| 2007/0112446 A1 | 5/2007 | Deveaux et al. | |
| 2008/0010425 A1 | 1/2008 | Funk et al. | |
| 2008/0098362 A1* | 4/2008 | Moore | G06F 11/3688 717/129 |
| 2008/0294708 A1 | 11/2008 | Rawlins et al. | |
| 2009/0271861 A1 | 10/2009 | Yoshida | |
| 2011/0161534 A1* | 6/2011 | Brandstaetter | H04B 1/38 710/104 |
| 2011/0202739 A1 | 8/2011 | Grisenthwaite | |
| 2011/0225402 A1* | 9/2011 | Grisenthwaite | G06F 9/30101 712/244 |

FOREIGN PATENT DOCUMENTS

| | | |
|---|---|---|
| EP | 1429246 A1 | 6/2004 |
| WO | 2005116842 A1 | 12/2005 |

OTHER PUBLICATIONS

Hennessy and Patterson, Computer Architecture A Quantitative Approach, 1996, Morgan Kaufmann, 2nd edition, 5 pages.*
EP 13169521.5, Search Report dated Feb. 13, 2014, 6 pages.
Extended European Search Report dated Feb. 13, 2014 for corresponding EP 13169521, pp. 1-6.

* cited by examiner

PROCESSING SYSTEMS AND METHODS FOR TRANSITIONING BETWEEN PRIVILEGE STATES BASED ON AN ADDRESS OF A NEXT INSTRUCTION TO BE FETCHED

RELATED APPLICATION

This application is a continuation of co-pending U.S. patent application Ser. No. 13/485,078, filed on May 31, 2012.

TECHNICAL FIELD

Embodiments relate generally to processor resource and execution protection methods and apparatus.

BACKGROUND

A typical computer system may provide different levels of system resource access to code executing on a processor. This often is achieved, for example, by associating one of multiple hierarchical privilege levels to each type of code that may run on the system. In such a system, the most trusted code (e.g., kernel code) is granted the highest level of privilege, and less trusted code (e.g., device drivers, applications, and other user code) is granted a lower level of privilege. The higher the level of privilege, the more access the code has to system resources. Conversely, the lower the level of privilege, the less access the code has to system resources. For example, kernel code may have virtually unrestricted access to system resources, whereas application code may be restricted from accessing certain memory areas, inputs/outputs (I/Os), and so on.

To reduce the risk that malicious or faulty code may compromise data and/or functionality of the system, hierarchical privilege schemes typically are hardware enforced. For example, a processor may implement "supervisor" and "user" modes of operation to enforce a hierarchical privilege scheme. In such a system, a hardware-mediated flag may be implemented, where the state of the flag is used to determine whether or not to allow execution of various resource-affecting operations. The flag may be set while the system is in supervisor mode, for example, allowing highly privileged code to have extensive access to system resources. Conversely, the flag may be cleared while the system is in user mode, thus restricting access to some resources by less privileged code.

The ability to execute code at various privilege levels on a processor allows software to be built utilizing these privilege levels, such that two or more levels of software can co-exist while maintaining hardware-enforced isolation. However, this ability typically comes at the cost of significant processor logic to track the privilege state and to control state changes. Generally, the logic for providing hardware enforcement of a hierarchical privilege scheme is an integral part of the processor design, and adding this functionality to an existing processor architecture can be costly in terms of hardware development and cycle time.

DETAILED DESCRIPTION

Embodiments described herein include resource and execution protection methods and apparatus that can be implemented in a processing system. Essentially, the embodiments enable resource and execution protection to be implemented at a lightweight cost, in terms of hardware. For example, resource and execution protection may be implemented in a system using relatively simple logic implemented in a processor, along with a set of registers that are used to store indications of resources that may be accessed by code having various privilege levels. An example of a processing system in which embodiments of resource and execution protection have been incorporated will now be described. As explained later, the example system of FIG. 1 is not meant to be limiting, and embodiments may be implemented in significantly different architectures, as well.

Figure 1:
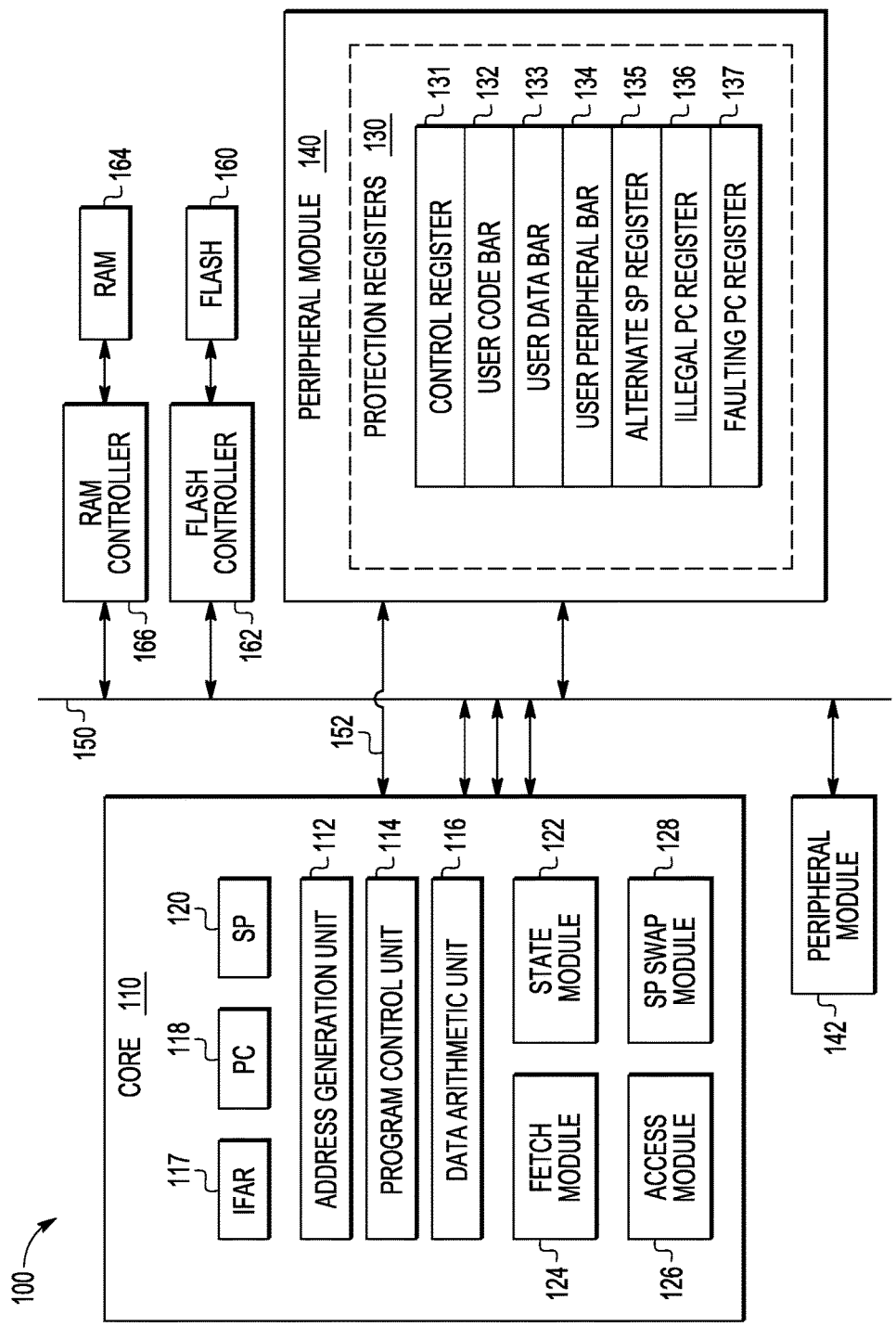
FIG. 1 is a simplified block diagram of a processing system, in accordance with an example embodiment.

FIG. 1 is a simplified block diagram of a processing system 100, in accordance with an example embodiment. At a minimum, system 100 includes one or more processor cores 110, memory resources (e.g., non-volatile flash memory 160 and volatile random access memory (RAM) 164), and a set of "protection" registers 130 (or other data storage structures) in which information relating to resource and execution protection may be stored. In addition, system 100 may include one or more peripheral modules 140, 142. For example, according to a more specific embodiment, the set of protection registers 130 are implemented as part of a peripheral module 140, which is accessible to the core 110 over a system bus 150. In addition or alternatively, direct signaling connections 152 may be present between core 110 and peripheral module 140 (e.g., to facilitate the exchange of values between core 110 and protection registers 130). In other embodiments, one or more of protection registers 130 may be located elsewhere (e.g., in core 110 or some other location). As will be explained in more detail later, protection registers 130 are used to implement embodiments of resource and execution protection mechanisms carried out by the system 100.

Flash memory 160 and RAM 164 also are accessible to the core 110 over system bus 150 via flash controller 162 and RAM controller 166, respectively. System 100 may include one or more other processor cores, busses, peripheral modules, code and data storage structures, inputs/outputs (I/Os), and other components, as well. In various embodiments, system 100 may be implemented on a single integrated circuit (e.g., as a system-on-a-chip) or on multiple integrated circuits (e.g., as a system-in-a-package or a system comprising multiple, separately packaged integrated circuits).

In an embodiment, core 110 includes an address generation unit 112, a program control unit 114, a data arithmetic unit 116, an instruction fetch address register (IFAR) 117, a program counter (PC) register 118, a stack pointer (SP) register 120, and various modules 122, 124, 126, 128. In other embodiments, core 110 may include additional or different components. Although IFAR 117, PC register 118, SP register 120, and modules 122, 124, 126, 128 are shown as being distinct from address generation unit 112, program control unit 114, and data arithmetic unit 116, this is for convenience and clarity of description only. In various embodiments, IFAR 117, PC register 118, SP register 120, and/or modules 122, 124, 126, 128 could be incorporated into any one or more of address generation unit 112, program control unit 114, and data arithmetic unit 116.

Essentially, core 110 is configured to fetch, decode, and execute code in the form of computer instructions. For example, but not by way of limitation, core 110 may fetch code stored in memory that is external to core 110 (e.g., code stored in flash memory 160). During code execution, core 110 may perform various arithmetic, logical, and I/O operations, along with accesses (e.g., reads/writes) to memory (e.g., RAM 164) and various peripherals (e.g., peripheral module 140, 142 and other peripheral modules (not illustrated)) over system bus 150. Most instructions executed by core 110 specify one or more operands. Additionally, in some cases, an instruction may include or specify an address in memory or elsewhere (e.g., flash memory 160, RAM 164, a peripheral module 140, 142, or some other location). For example, an instruction may include an address in flash memory 160, which indicates the location of an instruction to which the execution thread should jump. Alternatively, an instruction may include or specify an address in RAM 164, a peripheral 140, 142, or some other location from which a data value should be fetched, or to which a data value should be stored. Execution of such an instruction is considered to generate a data access event (e.g., a read or write event).

As will be described in more detail below and in accordance with various embodiments, core 110 is configured to implement resource and execution protection mechanisms using modules 122, 124, 126, 128 and information stored in protection registers 130. Essentially, modules 122, 124, 126, 128 include hardware (e.g., logic and other circuitry) to enable the functions described below to be performed. In some embodiments, the "modules" used to perform the functions described below may be implemented using both hardware and software. Accordingly, the term "module" is meant to include embodiments implemented using only hardware (e.g., logic gate configurations and other associated circuitry) and combinations of hardware and software. In addition, although modules 122, 124, 126, 128 are shown to be distinct from each other and from other portions of core 110, some or all of modules 122, 124, 126, 128 may be fully or partially integrated with each other and/or with other portions of core 110. Those skilled in the art would understand, based on the description herein, how to implement modules 122, 124, 126, 128, and therefore particular configurations of the modules 122, 124, 126, 128 are not discussed in detail herein.

Embodiments of the resource and execution protection mechanisms described herein support hardware-enforced separation of code and data having relatively high privilege levels from code and data having relatively low privilege levels. As used herein, the term "supervisor privilege level" refers to the highest privilege level implemented in the system 100, and "user privilege level" refers to a lower privilege level. Similarly, the term "supervisor code" refers to code designated to have the supervisor privilege level (e.g., operating system kernel code and other highly trusted code), and "user code" refers to code designated to have a user privilege level (e.g., application code, the execution of which is managed by the kernel code). Although the embodiments discussed in detail herein refer to only two privilege levels (i.e., supervisor and user privilege levels), other embodiments may implement hardware-enforced separation of code having more than two privilege levels, and such embodiments are intended to be included within the scope of the inventive subject matter. Prior to discussing embodiments of the resource and execution protection mechanisms in detail, basic operation of core 110 will first be discussed.

Core 110 may have a pipelined architecture, in which instruction execution is performed as a sequence of steps performed during consecutive clock cycles. For example, for any particular instruction, core 110 may perform the steps of fetching the instruction, decoding the instruction, executing the instruction, performing a memory access (when the instruction specifies an address in flash 160, RAM 164, or elsewhere), and, in some cases, register write back of the result of the instruction execution. In an embodiment, core 110 includes two instruction address registers that facilitate implementation of the pipelined architecture. These instruction address registers include IFAR 117 and PC register 118.

IFAR 117 is used to define the memory address of an instruction currently at the top of the instruction fetch pipeline, referred to herein as the "instruction fetch address." IFAR 117 may be loaded with an instruction fetch address on every instruction flow "discontinuity" (e.g., an instruction flow transition that does not include an access to an instruction stored in a sequential address in memory, but instead includes an access to an instruction stored in a non-sequential address). For example, an instruction flow discontinuity may occur due to a taken branch instruction, in response to execution of a particular instruction (e.g., a software interrupt, trap instruction, and so on), or in response to the occurrence of an exception condition. Once loaded with an instruction fetch address, a corresponding instruction fetch is initiated. More specifically, the instruction fetch proceeds onto the system bus 150 and to the targeted destination in memory (e.g., flash memory 160). Subsequently, the destination memory returns the fetched instruction back to core 110. As this and each subsequent fetch cycle completes, the address in the IFAR 117 is incremented by the width of the instruction fetch (or the "fetch width"), unless another instruction fetch discontinuity occurs. Absent an instruction fetch discontinuity, the instruction fetch pipeline continues sequentially generating addresses and accessing the appropriate destination memory. When an instruction fetch discontinuity occurs, which re-directs the fetch stream, the IFAR 117 is re-loaded with a new, non-sequential instruction fetch address, the targeted destination memory is accessed, and the instruction fetch pipeline resumes its sequential address generation and destination memory access processes.

As a fetched instruction is returned to core 110, the instruction gets loaded into the execution pipeline. PC register 118 is used to define the memory address of the instruction currently residing at the top of the execution pipeline, referred to herein as the "PC address." Once an instruction begins progressing through the execution pipeline, the PC address in the PC register 118 is incremented based on the instruction length simultaneously with a next instruction arriving at the top of the execution pipeline (either from an internal instruction buffer or from a fetch cycle on the system bus 150). In some cases, the instruction fetch width (e.g., the width of the instruction fetch bus) and the instruction length may be equal (e.g., both are two bytes, or some other length), in which case the addresses in the IFAR 117 and the PC register 118 are incremented by the same value (i.e., the instruction length). In other cases, the instruction fetch width may be different from (e.g., wider than) the instruction length. For example, the instruction fetch width may be twice the instruction length (e.g., four bytes and two bytes, respectively, or some other lengths), in which case each instruction fetch may result in fetching two instructions simultaneously into the core 110. In such an embodiment, until an instruction flow discontinuity is encountered, the address in the IFAR 117 would be incremented by the instruction fetch width (e.g., 2x bytes), and the address in the PC register 118 would be incremented by the instruction length (e.g., x bytes) at twice the rate of incrementing the IFAR 117. For ease of explanation, the discussion below may refer to fetching "an instruction" based on an address in the IFAR 117. Those skilled in the art would understand, based on the description herein, how embodiments of the inventive subject matter may be modified when multiple instructions are fetched based on an address in the IFAR 117 (e.g., when the instruction fetch width is wider than the instruction length).

At system start up (e.g., power on), address generation unit 112 loads a first instruction fetch address (e.g., a reset vector) into IFAR 117. The first instruction fetch address corresponds to the starting address in memory (e.g., in flash memory 160) of the system's initialization code (e.g., including basic input output system (BIOS) and kernel initialization code). Core 110 then fetches one or more first instructions (depending on the instruction fetch width) from one or more memory locations (e.g., in flash 160) that correspond to the instruction fetch address specified in IFAR 117. The PC register 118 is initialized with the address of the first fetched instruction, and the corresponding, fetched instruction then enters the execution pipeline. Upon entry into the execution pipeline, program control unit 114 decodes the instruction and controls its execution. As each instruction fetch is initiated, address generation unit 112 determines whether the instruction fetch address in IFAR 117 is to be incremented, or when there is an instruction flow discontinuity indicated in the instruction, the address generation unit 112 determines the instruction fetch address corresponding to a next instruction to be fetched. Either way, the instruction fetch address in IFAR 117 may be modified according to the determination.

As indicated previously, besides executing supervisor code (e.g., kernel code), core 110 also may execute user code having a relatively-low privilege level, when compared with the privilege level of the supervisor code. Various embodiments contemplate orderly transitions between the core 110 executing supervisor code and user code. More specifically, in an embodiment, the core 110 implements a state machine that includes at least a "supervisor state" (e.g., supervisor state 410, FIG. 4) and a "user state" (e.g., user state 420, FIG. 4). As will be described in more detail in conjunction with FIGS. 3 and 4, later, the state is determined based on the address of the most recent instruction that the core 110 has allowed to be fetched from memory (e.g., based on an instruction fetch address in IFAR 117). For example, the core 110 is in the supervisor state when the most recent instruction that the core 110 has allowed to be fetched is from a portion of memory allocated to supervisor code (e.g., supervisor code memory region 216, FIG. 2). Conversely, the core 110 is in the user state when the most recent instruction that the core 110 has allowed to be fetched is from a portion of memory allocated to user code (e.g., user code memory region 218, FIG. 2). In an embodiment, the privilege level of the instruction that the core 110 most recently allowed to be fetched defines a "current privilege state." As will be described in more detail later, core 110 includes a module (depicted in FIG. 1 as state module 122) configured to determine and maintain knowledge of the current privilege state. More particularly, in an embodiment, core 110 includes a module (e.g., state module 122) configured to determine whether the current privilege state is either the supervisor state or the user state by comparing at least one instruction address range indicator (e.g., a value stored in user code base address register (BAR) 132, 212, FIGS. 1 and 2, discussed later) with the address of the most recently allowed instruction fetch (e.g., an address based on the current instruction fetch address in IFAR 117). In an embodiment, state module 122 may form a portion of program control unit 114. In other embodiments, the hardware for performing this function may be located elsewhere.

Once the value in the IFAR 117 has been updated, core 110 may allow or disallow a next instruction to be fetched based on the current privilege state, the address from which the next instruction would be fetched (e.g., an address based on the instruction fetch address in IFAR 117), and an instruction address range indicator stored in protection registers 130, in an embodiment. As will be described in more detail later, core 110 includes a module (depicted in FIG. 1 as fetch module 124) configured to determine whether or not to allow or disallow fetching of an instruction. More particularly, in an embodiment, core 110 includes a module (e.g., fetch module 124) configured to determine whether the address of a next instruction to be fetched (e.g., an address based on the instruction fetch address in IFAR 117) is within a memory region (e.g., in flash memory 160) associated with the current privilege state or within a memory region associated with a different privilege state by comparing the next instruction fetch address with at least one instruction address range indicator (e.g., a value stored in user code BAR 132, discussed later). When the next instruction fetch address is not within a memory region associated with the current privilege state, core 110 is configured to allow the next computer instruction to be fetched, decoded, and executed only under certain conditions, as will be discussed later. In an embodiment, fetch module 124 may form a portion of program control unit 114. In other embodiments, hardware for performing this function may be located elsewhere. Assuming that fetching of an instruction is allowed, program control unit 114 controls the instruction decoding and execution processes. For example, under the control of program control unit 114, data arithmetic unit 116 (or other portions of the core 110) may perform any of a variety of arithmetic and logical operations that are necessary to perform (i.e., execute) the instruction.

As mentioned previously, an instruction may define a data reference (e.g., an address), which in turn may initiate access to a system resource (e.g., to a location in RAM 164, a peripheral 140, 142, or elsewhere). Regarding resource protection implemented in system 100, core 110 may permit or deny access to the resource based on the instruction's privilege level (or the current privilege state or the address from which the instruction was fetched), and a data address range indicator stored in protection registers 130, in an embodiment. As will be described in more detail later, core 110 includes a module (depicted in FIG. 1 as access module 126) configured to determine whether or not to permit or deny access to a particular system resource. More specifically, in an embodiment, core 110 includes a module (e.g., access module 126) configured to determine whether a data access address (e.g., an address referencing RAM 164) is generated when executing an instruction, and to determine whether the data access address is associated with the supervisor state or with the user state by comparing the data access address with at least one data address range indicator (e.g., a value stored in user data BAR 133, 222, FIGS. 1 and 2, discussed later). When the current privilege state is a privilege state in which access to the memory location (e.g., the location in RAM 164) is allowed, the core 110 is configured to allow access to the memory location corresponding to the data access address. In an embodiment, access module 126 may form a portion of program control unit 114. In other embodiments, hardware for performing this function may be located elsewhere.

As indicated previously, information in protection registers 130 may be accessed by core 110 in conjunction with providing resource and execution protection functions. Among other things, the system initialization code may include instructions which, when executed, establish various settings or values in protection registers 130. For example, protection registers 130 may include control register 131, user code BAR 132, user data BAR 133, user peripheral BAR 134, alternate SP register 135, illegal PC register 136, and faulting PC register 137.

Control register 131 is now briefly described, whereas the descriptions of each of the other registers 132-137 will be described below in appropriate sections. In an embodiment, control register 131 includes one or more register lock flags and an enable flag. When a single register lock flag is included, the register lock flag, when cleared, indicates to core 110 that values within protection registers 130 may be changed by code executing on core 110 (assuming the code has the appropriate privilege level). Conversely, when the register lock flag is set, the values in the protection registers 130 may not be modified (e.g., peripheral module 140 or protection registers 130 will not allow any code to modify the values in the protection registers 130). In an alternate embodiment, the control register 131 may include multiple register lock flags to provide a finer granularity of access to the protection registers 130 (e.g., each of the multiple register lock flags could be used to control access to a group of one or more of the protection registers 130). The enable flag, when set, indicates that the system's resource and execution protection mechanisms are enabled, and that core 110 should implement those mechanisms. When the enable flag is cleared, the core 110 will disable operations associated with the resource and execution protection mechanisms. In another embodiment, the core may selectively bypass operations associated with the resource and execution protection mechanisms.

In an embodiment, at system start-up or reset, the core 110 determines whether a resource and execution protection enable signal has been provided to the system (e.g., via an enable input). If so, the core 110 allows the initialization code to set the enable flag. In addition, the register lock flag is (or register lock flags are) cleared upon system reset, so that the initialization code may subsequently establish various values in registers 132-137. Once those values have been established in registers 132-137, the initialization code may set the register lock flag(s) so that other code may not alter the values in the registers 132-137 that correspond to the set flag(s). The description herein assumes that the values in the protection registers 130 (particularly registers 132-134) are not changed during normal operation of system 100 (e.g., after system initialization). In other embodiments, the values in some or all of the protection registers 132-134 may be re-loaded or changed after system initialization, as well (e.g., under certain circumstances and/or at various times). For example, the values in protection registers 132-134 may be changed to increase and/or reduce the amount of resources accessible to supervisor or user code. As another example, the values in certain protection registers 132-134 may be loaded (or re-loaded) each time a user process (e.g., a task) begins execution. The values in protection registers 132-134 may be changed at other times, as well. Although such embodiments are not discussed in detail herein, they are intended to be included within the scope of the inventive subject matter.

As will be explained in more detail later, registers 132-134 are used to define portions of various resources (e.g., flash memory 160, RAM 164, peripherals, and so on) that are associated with the supervisor state, and portions of the resources that are associated with the user state. In an embodiment, protection registers 130 may only be accessed by supervisor code (e.g., kernel code), and peripheral module 140 is considered to be a supervisor level resource.

In addition to establishing values in at least some of protection registers 130, the initialization code also may establish a stack for use by the supervisor code (referred to herein as a "supervisor stack" (e.g., supervisor stack 227, FIG. 2)). For example, the supervisor stack may be established by loading a "supervisor stack pointer" into SP register 120. Initially, the supervisor stack pointer may specify an address in memory (e.g., in RAM 164) of the origin of the supervisor stack (i.e., the base address of the supervisor stack). During execution of supervisor code, the supervisor stack pointer is maintained by the core 110. More specifically, as the supervisor code pushes data onto the supervisor stack and pops data off the supervisor stack, the supervisor stack pointer in SP register 120 is incremented and decremented, accordingly. In other embodiments, core 110 may use hardware stacks that operate in different manners. Either way, the supervisor stack pointer in SP register 120 always should point to the top element on the supervisor stack.

The core 110 also may establish at least one other stack for use by user code (e.g., in RAM 164). Such a stack is referred to herein as a "user stack" (e.g., user stack 229, FIG. 2), and the core 110 also maintains a stack pointer for a user stack (referred to herein as a "user stack pointer") while the core 110 is executing the user code. For ease of description, a single user stack is discussed herein, although other embodiments may implement multiple user stacks.

Because the core 110 can transition between executing supervisor code and user code, and because there is a stack associated with both supervisor code and user code (and thus stack pointers associated with both supervisor code and user code), various embodiments include a mechanism for swapping the supervisor and user stack pointers during transitions between the supervisor state and the user state. In an embodiment, system 100 includes an "alternate" SP register 135, which may be used to store either the supervisor stack pointer or the user stack pointer while the core 110 is in a different state. In other words, while the core 110 is in the supervisor state, the supervisor stack pointer is maintained in the core's SP register 120, and the user stack pointer is retained in the alternate SP register 135. As the core 110 transitions from the supervisor state to the user state, the value of the supervisor stack pointer in SP register 120 is swapped with the value of the user stack pointer in alternate SP register 135. While the core 110 is in the user state, the user stack pointer is maintained in the core's SP register 120, and the supervisor stack pointer is retained in the alternate SP register 135. As the core 110 transitions from the user state back to the supervisor state, the value of the user stack pointer in SP register 120 is swapped with the value of the supervisor stack pointer in alternate SP register 135. In other words, at any given time, the stack pointer stored in SP register 120 corresponds to whichever stack is associated with the current privilege state.

In an embodiment, core 110 includes a module (depicted in FIG. 1 as SP swap module 128) configured to swap the stack pointers stored in SP register 120 and alternate SP register 135 during transitions between the supervisor state and the user state. More particularly, in an embodiment, core 110 includes a module (e.g., SP swap module 128) configured to move the stack pointer from the SP register 120 into the alternate SP register 135 when a transition is performed between the current privilege state and a different privilege state, and simultaneously to move the stack pointer from the alternate SP register 135 into the SP register 120. According to an embodiment, the stack pointers in the SP register 120 and the alternate SP register 135 may be exchanged (or "swapped"), for example, via direct signaling connections 152. SP swap module 128 may form a portion of program control unit 114, in an embodiment. In other embodiments, hardware for performing this function may be located elsewhere.

In an embodiment, to implement execution protection, memory within which instructions are stored (e.g., flash memory 160 or code memory 210) is partitioned into regions, where each region corresponds to a privilege level (e.g., one or more regions correspond to the supervisor privilege level, and one or more different regions correspond to the user privilege level). Correspondingly, core 110 may determine the privilege level for each instruction based on the address at which the instruction is stored in the memory (i.e., in which region the instruction is stored).

The code memory regions (separated by one or more partitions) are defined using at least one "instruction address range indicator," in an embodiment. The address range indicator(s) define one or more first memory regions allocated for storing computer instructions associated with the supervisor state ("supervisor code"), and define one or more second memory regions allocated for storing computer instructions associated with the user state ("user code"). In a more specific embodiment, an instruction address range indicator includes an address that defines a boundary (e.g., in flash memory 160 or code memory 210) between a first region of memory associated with supervisor code and a second region of memory associated with user code. Any instructions stored in addresses less than (or equal to or less than, in another embodiment) the instruction address range indicator correspond to supervisor code, and any instructions stored in addresses equal to or greater than (or greater than, in another embodiment) the instruction address range indicator correspond to user code. In an alternate embodiment, the reverse could hold true. Either way, in an embodiment, fetch module 124 (or other circuitry) is configured to determine that a next instruction fetch address (e.g., an address based on the value in IFAR 117) is within a memory region (e.g., a region in flash memory 160 or code memory 210) associated with the supervisor state when the next instruction fetch address falls within one of the memory regions allocated to supervisor code, or that the next instruction fetch address is associated with the user state when the next instruction fetch address falls within one of the memory regions allocated to user code.

The instruction address range indicator specifies the base address for storage of user code within the code memory (e.g., within flash memory 160 or code memory 210), in an embodiment. Alternatively, the instruction address range indicator may specify the highest address (upper boundary) for storage of supervisor code within the code memory. Either way, the instruction address range indicator defines a boundary, in memory, between the supervisor code region and the user code region. The description below discusses an embodiment in which the instruction address range indicator includes an address that specifies the base address for storage of user code within the code memory (e.g., within flash memory 160 or code memory 210), and this address is referred to herein as the "user code base address." In an embodiment, the user code base address is established (stored) within a user code BAR 132 during execution of the system's initialization code. In embodiments in which multiple, discontinuous regions of memory are allocated to supervisor code and/or to user code, multiple instruction address range indicators may be stored in the system 100 (e.g., in multiple registers). Such embodiments are intended to be included within the scope of the inventive subject matter, but are not discussed in detail herein.

In an embodiment, to implement resource protection, resources (e.g., RAM 164, peripherals 140, 142, and so on) that may be accessed by the core 110 are partitioned into groups, where each group corresponds to a privilege level (e.g., one or more groups correspond to the supervisor privilege level, and one or more groups correspond to the user privilege level). Correspondingly, core 110 (or more specifically access module 126) may determine whether an instruction associated with a privilege level is attempting to access a resource (e.g., generating a data reference) that has the same or a different privilege level from the instruction.

Memory-type resources (e.g., RAM 164 or data memory 220) may be partitioned into one or more supervisor data regions and into one or more user data regions, and the regions are defined using at least one "data address range indicator," in an embodiment. The data address range indicator(s) define one or more first memory regions allocated for storing data associated with the supervisor state ("supervisor data"), and define one or more second memory regions allocated for storing data associated with the user state ("user data"). In a more specific embodiment, a data address range indicator includes an address that defines a boundary (e.g., in RAM 164 or data memory 220) between a first region of memory associated with supervisor data and a second region of memory associated with user data. The core 110 may allow supervisor code to access any data stored in either memory region (e.g., both supervisor data and user data), but the core 110 may allow user code only to access data stored in addresses equal to or greater than (or greater than, in another embodiment) the data address range indicator (e.g., only user data). In an alternate embodiment, the core 110 may allow user code only to access data stored in addresses less than (or less than or equal to, in another embodiment) the data address range indicator. Either way, in an embodiment, access module 126 (or other circuitry) is configured to determine that a data access address is associated with the supervisor state when the data access address falls within one of the memory regions allocated to supervisor data, and to determine that the data access address is associated with the user state when the data access address falls within one of the memory regions allocated to user data.

The data address range indicator specifies the base address for storage of user data within the memory resource (e.g., within RAM 164 or data memory 220), in an embodiment. Alternatively, the data address range indicator may specify the highest address (upper boundary) for storage of supervisor data within the memory resource. Either way, the data address range indicator defines a boundary, in memory, between the supervisor data space and the user data space. The description below discusses an embodiment in which the data address range indicator includes an address that specifies the base address for storage of user data within a memory resource (e.g., within RAM 164), and this address is referred to herein as the "user data base address." In an embodiment, the user data base address is established (stored) within a user data BAR 133 during execution of the system's initialization code. In embodiments in which multiple, discontinuous regions of memory are allocated to supervisor data and/or to user data, multiple data address range indicators may be stored in the system 100 (e.g., in multiple registers). Such embodiments are intended to be included within the scope of the inventive subject matter, but are not discussed in detail herein.

In an embodiment, peripheral resources (e.g., peripheral modules 140, 142, and other peripherals (not illustrated)) may be partitioned into one or more supervisor peripheral groups and into one or more user peripheral groups, and the groups are defined using at least one "peripheral address range indicator." In a more specific embodiment, a peripheral address range indicator includes an address that defines a boundary between a first set of peripherals accessible to supervisor code (e.g., of which peripheral module 140 is a part) and a second set of peripherals accessible to both supervisor and user code. The core 110 may allow supervisor code to access any of the peripherals (e.g., there are no restrictions on the peripherals accessible to supervisor code), but the core 110 may allow user code only to access peripherals having addresses equal to or greater than (or greater than, in another embodiment) the peripheral address range indicator. In an alternate embodiment, the core 110 may allow user code only to access peripherals having addresses less than (or equal to or less than, in another embodiment) the peripheral address range indicator.

The peripheral address range indicator specifies a smallest address of a peripheral that user code may access, in an embodiment. Alternatively, the peripheral address range indicator may specify the largest address of a peripheral that only supervisor code may access. Alternatively, multiple peripheral address range indicators may be used to identify addresses of multiple groups of peripherals that may be accessible to user code, supervisor code, or both. Either way, the peripheral address range indicator defines a group of peripherals that is accessible only to supervisor code, and a group of peripherals that is accessible to both supervisor and user code. The description below describes an embodiment in which the peripheral address range indicator includes an address that specifies the address of a particular peripheral, and this address is referred to herein as the "user peripheral base address." In an embodiment, the user peripheral base address is established (stored) within a user peripheral BAR 134 during execution of the system's initialization code.

Figure 2:
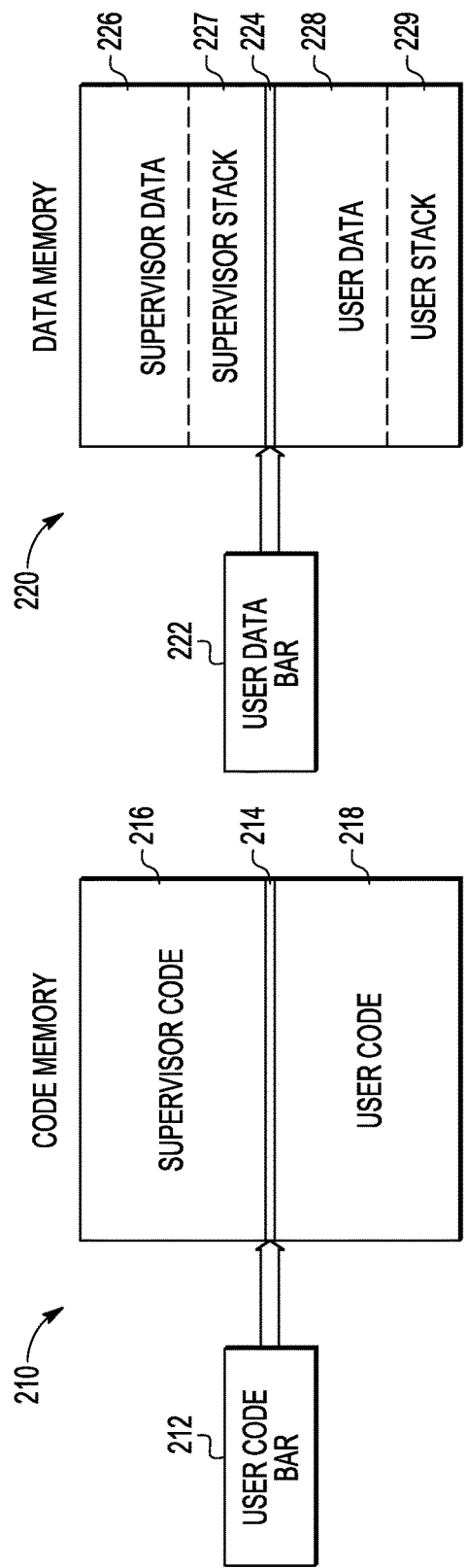
FIG. 2 is a simplified example of partitioned code and data memories, according to an example embodiment.

To more fully convey the concept of resource partitioning using protection registers 130, FIG. 2 is provided, which is a simplified example of partitioned code memory 210 (e.g., flash memory 160) and a partitioned data memory 220 (e.g., RAM 164), according to an example embodiment. FIG. 2 also illustrates a user code BAR 212 (e.g., user code BAR 132) and a user data BAR 222 (e.g., user data BAR 133). Although partitioning of peripherals into groups associated with the supervisor and user states is not depicted in FIG. 2, peripheral partitioning should be understood by the description elsewhere herein.

In an embodiment, in conjunction with execution protection, an instruction address range indicator is stored in the user code BAR 212 (e.g., during system initialization or at other times), and the instruction address range indicator defines a partition 214 between a first memory region 216 allocated for storing supervisor code (a "supervisor code memory region"), and a second memory region 218 allocated for storing user code (a "user code memory region"). During system operation, the core (e.g., core 110) compares the address of each next instruction to be fetched (e.g., an address based on the value in IFAR 117) with the instruction address range indicator. When the comparison indicates that the address of the next instruction to be fetched falls within the first memory region 216, the core determines that the next instruction to be fetched is supervisor code. Conversely, when the comparison indicates that the address of the next instruction to be fetched falls within the second memory region 218, the core determines that the next instruction to be fetched is user code.

The core may then determine whether or not to allow the next instruction to be fetched and/or whether a state change that may be necessitated by the fetch is allowed. As mentioned previously, when the next instruction fetch address (e.g., an address based on the value in IFAR 117) is not within a memory region associated with the current privilege state, the core may be configured to allow a state change to occur and the next computer instruction to be fetched only when a transition from the current privilege state to the different privilege state is allowed. More specifically, state changes between the user state and the supervisor state may be allowed only under certain conditions, in an embodiment.

In an embodiment, when the current privilege state is the supervisor state, and the next instruction fetch address is within the user code memory region 218, the core may allow a "normal" transition from the supervisor state to the user state (and may allow the next instruction to be fetched) only in response to a "legal supervisor-to-user state transition event." For example, a legal supervisor-to-user state transition event may include the core's execution of one of a first set of instructions (e.g., including a return from interrupt instruction), which caused the next instruction fetch address (e.g., an address based on the value in IFAR 117) to be updated. Conversely, the core may disallow the state change (and disallow the next instruction from being fetched) when the next instruction fetch address was updated in response to anything other than a legal supervisor-to-user state transition event (e.g., the core's execution of an instruction that is not in the first set of instructions).

According to a further embodiment, when the current privilege state is the user state, and the next instruction fetch address is within the supervisor code memory region 216, the core may allow a "normal" transition from the user state to the supervisor state (and may allow the next instruction to be fetched) only in response to a "legal user-to-supervisor state transition event." For example, legal user-to-supervisor state transition events may include: 1) the core's execution of one of a second set of instructions (e.g., including a software interrupt instruction, a trap instruction, and so on), which caused the next instruction fetch address to be updated; and/or 2) detection of an exception condition that causes the core to abandon (at least temporarily) its current execution thread and pass control back to supervisor code (e.g., to an interrupt service routine of the kernel configured to handle the exception condition). For example, an exception condition may include assertion of an I/O interrupt signal, or some other event. In addition to a "normal" transition from the user state to the supervisor state, the core also may implement a "fault-based" transition from the user state to the supervisor state (e.g. in response to detection of an error or fault condition as discussed later in conjunction with blocks 313, 322, FIG. 3).

In conjunction with resource protection, a data address range indicator is stored in the user data BAR 222 (e.g., during system initialization or at other times), and the data address range indicator defines a partition 224 between a first memory region 226 allocated for storing supervisor data (a "supervisor data memory region"), and a second memory region 228 allocated for storing user data (a "user data memory region"), in an embodiment. During system operation, the core (e.g., core 110) compares the address of each requested data access with the data address range indicator. When the comparison indicates that the address of data to be accessed falls within the first memory region 226, the core determines that the data to be accessed is supervisor data. Conversely, when the comparison indicates that the address of the data to be accessed falls within the second memory region 228, the core determines that the data to be accessed is user data.

The core may then determine whether to permit or deny the data access. As mentioned previously, supervisor code may access any data stored in either type of memory region (e.g., both supervisor data and user data stored in both memory regions 226, 228), but user code may only access data stored in a user data memory region (e.g., only user data stored in memory region 228). Accordingly, when the current privilege state is the supervisor state, the core may allow any requested data access to be performed. Conversely, when the current privilege state is the user state and instruction includes a reference to data within the supervisor data memory region 226, the core will not permit the data access. When the current privilege state is the user state and the instruction includes a reference to data within the user data memory region 228, the core will permit the data access.

A portion of supervisor data memory region 226 is allocated to a supervisor stack 227, and a portion of data memory region 228 is allocated to a user stack 229, in an embodiment. In other words, supervisor data memory region 226 includes the supervisor stack 227, and data memory region 228 includes the user stack 229. As discussed previously, the system maintains a supervisor stack pointer to indicate the address of the top of the supervisor stack, and a user stack pointer to indicate the address of the top of the user stack. The supervisor stack pointer is stored in the core's stack pointer register (e.g., SP register 120, FIG. 1) while the core is in the supervisor state, and the user stack pointer is stored in the core's stack pointer register while the core is in the user state. The stack pointer corresponding to whichever state is not the current state is maintained in an alternate stack pointer register (e.g., alternate SP register 135, FIG. 1).

Figure 3:
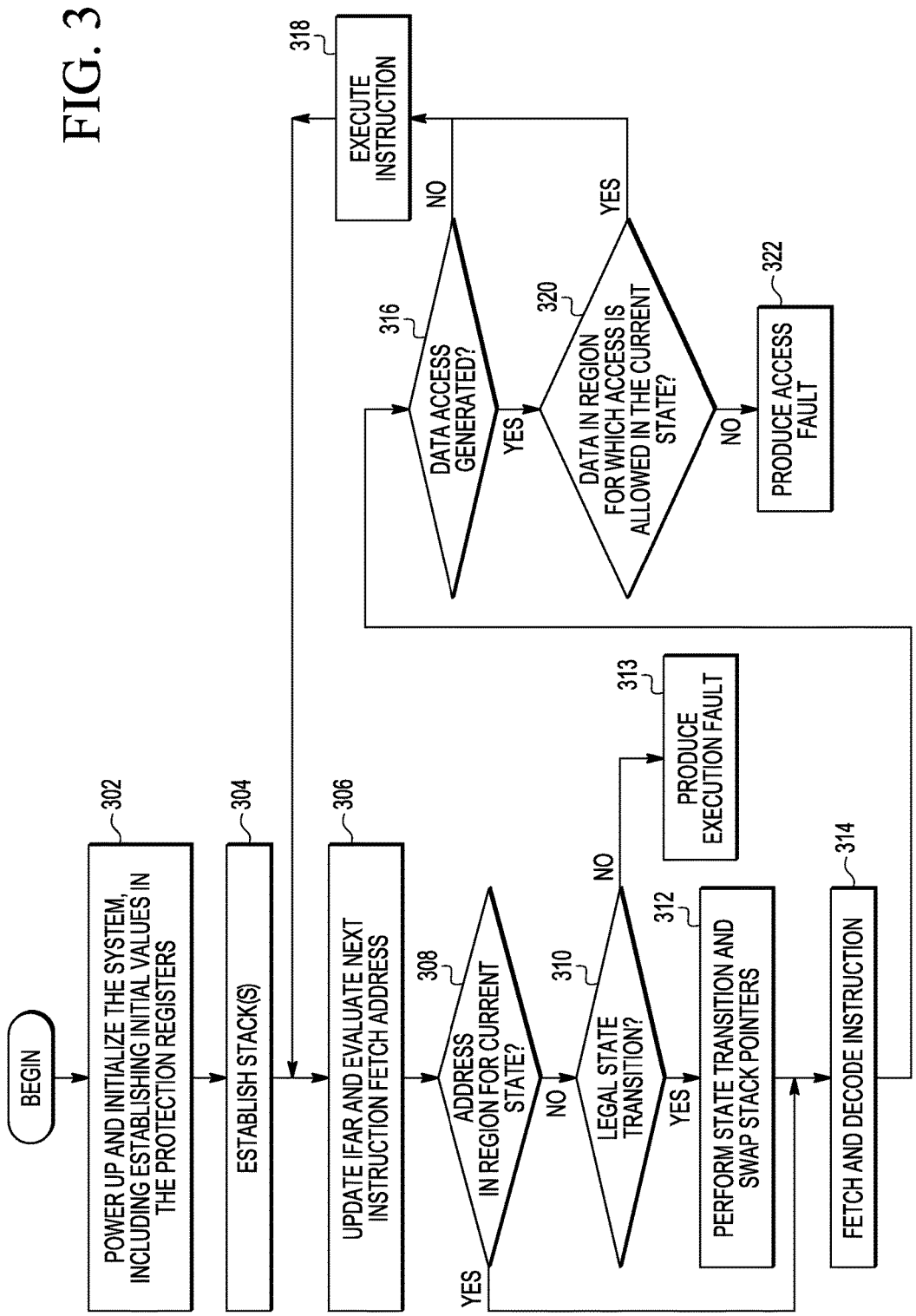
FIG. 3 is a flowchart of a method for operating a system that implements resource and execution protection, in accordance with an example embodiment.

FIG. 3 is a flowchart of a method for operating a system that implements resource and execution protection, in accordance with an example embodiment. For enhanced understanding, FIG. 3 should be viewed in conjunction with FIG. 4, which is a simplified state diagram illustrating supervisor and user states 410, 420 and transitions between them, in accordance with an example embodiment. During the description of the flow of operations depicted in FIG. 3, reference will be made to the supervisor and user states 410, 420 of FIG. 4. For ease of understanding, the flowchart depicted in FIG. 3 does not indicate the parallelism that may be employed in a system that implements a pipelined architecture. For example, although the flowchart depicts steps of updating the IFAR (block 306), fetching and decoding an instruction (block 314), and executing an instruction (block 318) in a sequential manner, it should be understood that, once a first instruction begins progressing through the instruction pipeline, certain of these processes may be performed in parallel in conjunction with executing a sequence of instructions. Those skilled in the art would understand how to implement the concepts inherent in the flowchart of FIG. 3 in a system that includes a pipelined architecture.

The method may begin, for example, when the core (e.g., core 110, FIG. 1) is powered up (or reset), and the system is initialized through execution of initialization code, in block 302. As used herein, "initialization code" means any code that is executed by the core to initialize the system up to the point when the system is ready to perform normal operations (e.g., including executing user code). For example, system initialization may include executing BIOS code, power-on self test (POST) code, bootstrap code, and kernel code responsible for booting up the operating system. More specifically, at power up, an address for a first instruction is established in the IFAR and PC register (e.g., an address corresponding to a reset vector is loaded into IFAR 117 and a corresponding address is loaded into PC register 118, FIG. 1), and the corresponding instruction is fetched from memory, decoded, and executed. As each instruction proceeds through the execution pipeline, the addresses in the IFAR and PC register are updated, and the next instruction is fetched, decoded, and executed. Ultimately during initialization, the core begins executing the kernel. In an embodiment, the initialization code is considered to be supervisor code, and the core initially defines the current privilege state to be the supervisor state 410. Later, as will be discussed below, the core defines the current privilege state to be the supervisor state 410 or the user state 420 based on the address range indicator(s) and the instruction address from which a currently-executing instruction was fetched from memory.

In an embodiment, one process performed by the initialization code is to configure the system to implement resource and execution protection by initializing values in the registers that are utilized for those purposes (e.g., protection registers 130, FIG. 1). Accordingly, the initialization code stores values in those register values as described below. More particularly, and as discussed previously, one of the protection registers includes a control register (e.g., control register 131, FIG. 1), which includes one or more register lock flags and an enable flag. In an embodiment, at reset, the enable flag is set (assuming that a resource and execution protection enable signal has been provided to the system), and the register lock flag is (or register lock flags are) cleared. The initialization code then may write values into various protection registers (e.g., registers 132-134, FIG. 1). With the enable flag set, the core will implement resource and execution protection according to the various embodiments.

To configure the resource and execution protection capabilities of the system, the initialization code stores at least one instruction address range indicator and at least one data address range indicator in the protection registers. For example, in an embodiment, the initialization code may store an instruction address range indicator (e.g., an address referencing flash memory 160, FIG. 1) in a user code base address register (e.g., user code BAR 132, FIG. 1), which defines a partition between a supervisor code region and a user code region in memory (e.g., in flash memory 160, FIG. 1). More specifically, and as discussed previously, the instruction address range indicator defines a memory region allocated for storing computer instructions associated with a supervisor state (e.g., supervisor state 410) and defines a memory region allocated for storing computer instructions associated with a user state (e.g., user state 420). In addition, the initialization code may store a data address range indicator (e.g., an address referencing RAM 164, FIG. 1) in a data code base address register (e.g., user data BAR 133, FIG. 1), which defines a partition between a supervisor data region and a user data region in memory (e.g., in RAM 164, FIG. 1). More specifically, and as discussed previously, the data address range indicator defines a memory region allocated for storing data associated with a supervisor state (e.g., supervisor state 410) and defines a memory region allocated for storing data associated with a user state (e.g., user state 420). Finally, the initialization code may write a peripheral address range indicator (e.g., a peripheral address) into a peripheral code base address register (e.g., user peripheral BAR 134, FIG. 1), which defines a group of peripheral devices that is accessible to supervisor code and a group of peripheral devices that is accessible to user code.

The system is configured so that supervisor code may access both supervisor and user data regions and peripherals, and user code may access only user data regions and peripherals, in an embodiment. Once the protection registers that define supervisor and user code regions, data regions, and peripherals have been initialized, the initialization code may set the corresponding register lock flag(s) (e.g., in control register 131, FIG. 1) so that the values in the protection registers are not inadvertently overwritten. In an embodiment, the protection registers are in a peripheral that is designated as being accessible only to supervisor code (e.g., the peripheral address range indicator is such that the peripheral for the protection registers is in a group of peripherals accessible only to supervisor code). Accordingly, the protection registers are not accessible to user code.

In block 304, the initialization code also establishes the supervisor stack (e.g., supervisor stack 227, FIG. 2) by writing a supervisor stack pointer into a stack pointer register (e.g., SP register 120, FIG. 1). As discussed previously, the initial supervisor stack pointer may specify an address in memory (e.g., in RAM 164) corresponding to the origin of the supervisor stack (e.g., the base address of supervisor stack 227, FIG. 2). In an embodiment, the initialization code also may establish a user stack at this point (e.g., user stack 229, FIG. 2), although the user stack may be established later (e.g., after the initialization code has executed, such as immediately before a first instance of user code executes). Either way, supervisor code executing on the core may establish the user stack by storing an address that corresponds to the origin of the user stack (e.g., the base address of user stack 229, FIG. 2) in the alternate stack pointer register (e.g., alternate SP register 135, FIG. 1). As will be clarified by the following discussion, the stack pointer in the core's stack pointer register (e.g., SP register 120, FIG. 1) corresponds to the stack for the current privilege state, and the stack pointer in the alternate stack pointer register (e.g., alternate SP register 135, FIG. 1) corresponds to the stack for a privilege state other than the current privilege state. In other words, for example, when the current privilege state is the supervisor state, the core's stack pointer register contains the stack pointer for the supervisor stack, and the alternate stack pointer register may contain a stack pointer for the user stack. Conversely, when the current privilege state is the user state, the core's stack pointer register contains the stack pointer for the user stack, and the alternate stack pointer register contains a stack pointer for the supervisor stack.

Once system initialization is completed, the core may enter a normal operating mode in which the core fetches, decodes, and executes instructions in accordance with the program flow. More specifically, in block 306, prior to each instruction fetch, the core updates the addresses in the IFAR (e.g., IFAR 117, FIG. 1) to correspond to the next instruction fetch address, and later updates the address in the PC register (e.g., PC register 118, FIG. 1) when the instruction enters the execution pipeline. Absent a branch or jump specified in a previous instruction, the core increments the addresses in the IFAR and PC register by the instruction fetch width and the instruction length, respectively, at the appropriate times. Otherwise, if a previous instruction specified a branch or jump to a location at a non-sequential address in memory, the core updates the address in the IFAR to correspond to the specified address. Once the address in the IFAR has been updated, the core evaluates the next instruction fetch address.

In block 308, as part of the evaluation, the core determines whether the next instruction fetch address indicates that the next instruction should be accessed from a region of code memory that corresponds to the current privilege state, or from a region of code memory that corresponds to a different privilege state. This may be achieved by comparing (e.g., by fetch module 124, FIG. 1) the next instruction fetch address with the instruction address range indicator (e.g., in user code BAR 132, FIG. 1) to determine the region in which the next instruction to be fetched is stored, and then determining whether that region is associated with the current privilege state. For example, when the current privilege state is the supervisor state 410, and the next instruction fetch address is in a region of code memory allocated to user code (e.g., region 218, FIG. 2), the core determines that the next instruction fetch address does not correspond to a region of code memory associated with the current privilege state. Similarly, when the current privilege state is the user state 420, and the next instruction fetch address is in a region of code memory allocated to supervisor code (e.g., region 216, FIG. 2), the core determines that the next instruction fetch address does not correspond to a region of code memory associated with the current privilege state.

Figure 4:
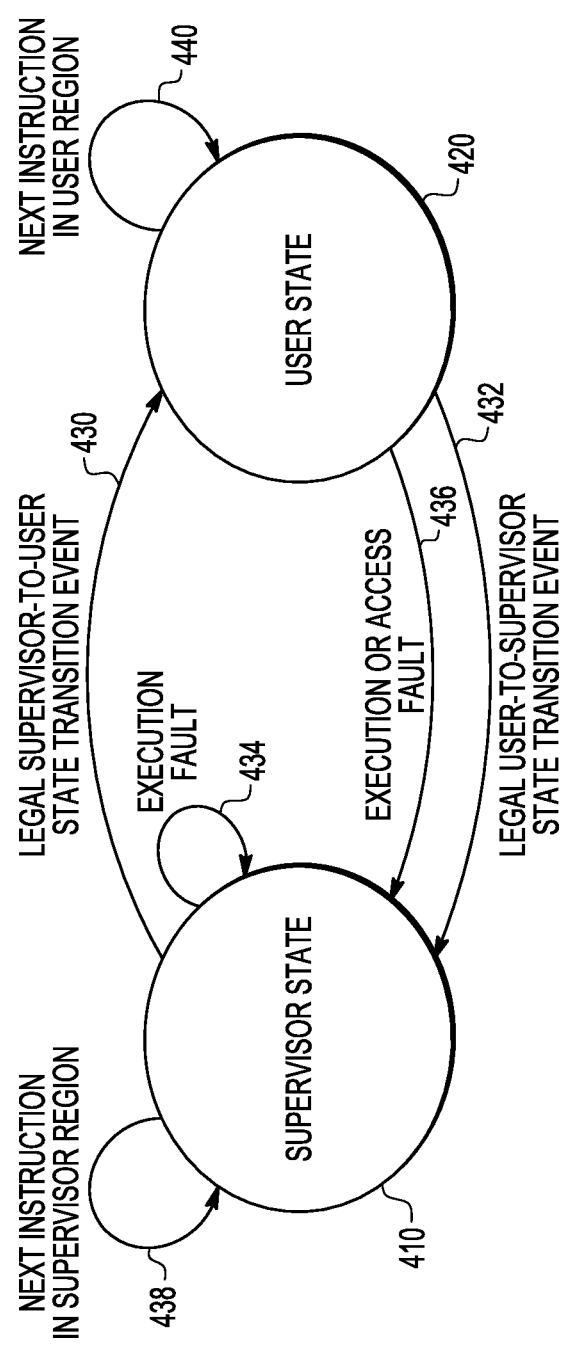
FIG. 4 is a simplified state diagram illustrating supervisor and user states and transitions between them, in accordance with an example embodiment.

When the next instruction fetch address indicates that the next instruction should be accessed from a region of code memory that corresponds to a different privilege state, a further determination may be made (e.g., by fetch module 124, FIG. 1), in block 310, whether the state transition would be a legal state transition. As discussed previously, for example, the core may determine that a state transition from the supervisor state 410 to the user state 420 is allowed when a legal supervisor-to-user state transition event has occurred (e.g., the core executed of one of a first set of instructions, including a return from interrupt instruction). Similarly, the core may determine that a state transition from the user state 420 to the supervisor state 410 is allowed when a legal user-to-supervisor state transition event has occurred (e.g., the core executed one of a second set of instructions, including a software interrupt instruction, a trap instruction, and so on), and/or detection of an exception condition that causes the core to abandon its current execution thread and pass control back to supervisor code (e.g., assertion of an I/O interrupt signal). Legal supervisor-to-user and user-to-supervisor state transitions are indicated in FIG. 4 by arrows 430, 432.

When the core determines that a state transition is legal (as determined in block 310), the state transition is performed in block 312 by changing (e.g., by state module 122, FIG. 1) the current privilege state to the privilege state associated with the next instruction to be fetched (e.g., the instruction evaluated in conjunction with block 310). In addition, the stack pointer stored in the core's stack pointer register (e.g., SP register 120, FIG. 1) is swapped (e.g., by SP swap module 128, FIG. 1) with the stack pointer stored in the alternate stack pointer register (e.g., alternate SP register 135, FIG. 1).

When a determination is made in block 310 that a state transition is not legal, the core forces the current privilege state to be the supervisor state (if it is not already), and fault handling supervisor code produces an execution fault, in block 313. For example, when the current privilege state is the supervisor state 410 and supervisor code attempts to jump to user code using an illegal instruction (e.g., an instruction other than a return from interrupt type of instruction), the core remains in supervisor state 410 (as indicated in FIG. 4 by arrow 434) and an execution fault is generated. Conversely, for example, when the current privilege state is the user state 420 and user code attempts to jump to supervisor code using an illegal instruction (e.g., an instruction other than a software interrupt type of instruction), the core performs a transition from the user state 420 to the supervisor state 410 (as indicated in FIG. 4 by arrow 436) and an execution fault is generated. In conjunction with the state transition, the stack pointer in the core's stack pointer register (e.g., SP register 120, FIG. 1) is swapped with the stack pointer in the alternate stack pointer register (e.g., alternate SP register 135, FIG. 1).

In an embodiment, production of an execution fault includes executing supervisor code (e.g., a kernel fault handling routine) that stores the address associated with the illegal instruction (i.e., the address in PC register 118 corresponding to the illegal instruction). For example, the address may be stored in a protection register (e.g., illegal PC register 136, FIG. 1), along with other information that may be relevant to reporting or handling the fault. Assuming the fault can be handled without significantly interrupting program flow, the method may return to block 306 to update the address in the IFAR and continue executing instructions associated with the program flow. Otherwise, the method may end.

Referring again to block 308, when the current privilege state is the supervisor state 410, and the next instruction address is in a region of core memory allocated to supervisor code (e.g., region 216, FIG. 2), the core determines that the next instruction address corresponds to a region of code memory associated with the current privilege state, and the method proceeds to block 314. Similarly, when the current privilege state is the user state 420, and the next instruction address is in a region of core memory allocated to user code (e.g., region 218, FIG. 2), the core determines that the next instruction address corresponds to a region of code memory associated with the current privilege state, and the method proceeds to block 314. In either case, as indicated by arrows 438, 440 in FIG. 4, the current privilege state is not changed.

When the core has determined (in block 308) that the next instruction address corresponds to a region of code memory associated with the current privilege state, or when a legal state transition has been performed (in block 312), the core may fetch the instruction corresponding to the next instruction fetch address in the IFAR, and may decode the instruction, in block 314.

In block 316, the core then may determine whether execution of the instruction would generate a data access. For example, the instruction may include a reference to a location at which data is stored in data memory (e.g., in RAM 164, FIG. 1). When execution of the instruction would not generate a data access, the core executes the instruction in block 318, and the method iterates as shown (e.g., to continue executing instructions associated with the program flow).

When execution of the instruction would generate a data access, the core (e.g., access module 126, FIG. 1) determines whether the data access address is in a region of data memory (e.g., RAM 164, FIG. 1) for which access is allowed in the current privilege state. For example, as discussed previously, supervisor code may be permitted to access data in both supervisor and user data regions (e.g., regions 226, 228, FIG. 2), and user code may be permitted to access data only in a user data region (e.g., region 228, FIG. 2). Accordingly, when the current privilege state is the supervisor state, the core may allow any data access. Conversely, when the current privilege state is the user state, the core may allow the data access only if the data access address is in a user data region in a supervisor data region (e.g., region 228, FIG. 2).

In an embodiment, a comparison is made (e.g., by access module 126, FIG. 1) between the data access address and the data address range indicator (e.g., in user data BAR 133, FIG. 1) to determine the region in which the data access address is located. A determination is then made as to whether a data access within that region is allowed while the core is in the current privilege state (e.g., in the privilege state corresponding to the decoded instruction). When the data access is allowed, the core executes the instruction in block 318 (including performing the data access), and the method iterates as shown (e.g., the program counter is updated in block 306, and the method continues).

When a determination is made in block 320 that the data access address is in a region of data memory (e.g., RAM 164, FIG. 1) for which access is not allowed in the current privilege state, the core forces the current privilege state to be the supervisor state (if it is not already), and fault handling supervisor code produces an access fault, in block 322. For example, when the current privilege state is the user state 420 and user code attempts to access data in a supervisor data region (e.g., region 226, FIG. 2), the core performs a transition from the user state 420 to the supervisor state 410 (as indicated in FIG. 4 by arrow 436), the data access is prohibited, and an access fault is generated. In conjunction with the state transition, the stack pointer in the core's stack pointer register (e.g., SP register 120, FIG. 1) is swapped with the stack pointer in the alternate stack pointer register (e.g., alternate SP register 135, FIG. 1).

In an embodiment, production of an access fault includes executing supervisor code (e.g., a kernel fault handling routine) that stores the address associated with the illegal instruction. For example, the address may be stored in a protection register (e.g., faulting PC register 137, FIG. 1), along with other information that may be relevant to reporting or handling the fault. In an alternate embodiment, the faulting data address may be stored in register 137 (e.g., register 137 may be an "illegal data address" register). Assuming the fault can be handled without significantly interrupting program flow, the method may return to block 306 to continue executing instructions associated with the program flow. Otherwise, the method may end.

It is to be understood that certain ones of the process blocks depicted in FIG. 3 may be performed in parallel with each other or with performing other processes. In addition, it is to be understood that the particular ordering of the process blocks depicted in FIG. 3 may be modified, while achieving substantially the same result. Accordingly, such modifications are intended to be included within the scope of the inventive subject matter.

Although the embodiments discussed above focus primarily on a system in which two privilege levels are implemented (e.g., supervisor and user levels), it is to be understood that the embodiments also could be implemented in a system in which more than two privilege levels are implemented (e.g., a system that implements a ring-based security scheme having three or more privilege rings). Those of skill in the art would understand, based on the description herein, how to modify the various described embodiments to implement the embodiments in a system that supports more than two privilege levels. In addition, although a particular system configuration is described in conjunction with FIG. 1, above, embodiments may be implemented in systems having other architectures, as well. For example, although system 100 includes various protection registers 130 used to store values used in conjunction with resource and execution protection, and the protection registers 130 are part of a module 140 that is separate from the core 110 and accessible to the core 110 over a bus 150 and/or other connections 152, other embodiments may be configured to store the values elsewhere, including in the core 110 itself. Further, embodiments may be implemented in a multi-processor system and/or a system having a significantly different architecture from that of FIG. 1. These and other variations are intended to be included within the scope of the inventive subject matter.

Thus, various embodiments of resource and execution protection methods and apparatus have been described. An embodiment of a processing system includes a first module and a second module. The first module is configured to maintain knowledge of whether a current privilege state is a first privilege state or a second privilege state based on an address of an instruction fetched from memory. The second module is configured to determine whether a next instruction fetch address corresponds to a location within a first memory region associated with the current privilege state or within a second memory region associated with a different privilege state by comparing the next instruction fetch address with at least one instruction address range indicator. When the next instruction fetch address is not within the first memory region associated with the current privilege state, the second module allows the next computer instruction to be fetched only when a transition from the current privilege state to the different privilege state is legal.

In a further embodiment, the processing system includes a third module configured to determine that a data access address is generated for a computer instruction, to determine whether the data access address is associated with the first privilege state or with the second privilege state by comparing the data access address with at least one data address range indicator, and to allow access to a memory location corresponding to the data access address when the current privilege state is a privilege state in which access to the memory location is allowed.

An embodiment of a processing method includes storing at least one instruction address range indicator that defines one or more first memory regions allocated for storing computer instructions associated with a first privilege state and that defines one or more second memory regions allocated for storing computer instructions associated with a second privilege state. The method further includes defining a current privilege state as the first privilege state or the second privilege state based on an address of an instruction fetched from memory, and determining whether a next instruction fetch address corresponds to a location within a memory region associated with the current privilege state or within a memory region associated with a different privilege state by comparing the next instruction fetch address with the at least one instruction address range indicator. When the next instruction fetch address does not correspond to a location within the memory region associated with the current privilege state, the next computer instruction is allowed to be fetched only when a transition from the current privilege state to the different privilege state is legal.

In a further embodiment, the processing method includes storing at least one data address range indicator that defines one or more third memory regions allocated for storing data associated with the first privilege state, and defines one or more fourth memory regions allocated for storing data associated with the second privilege state. The method further includes determining that a data access address is generated by a computer instruction. When the data access is generated, a determination is made whether the data access address is for a memory location associated with the first privilege state or a memory location associated with the second privilege state by comparing the data access address with the at least one data address range indicator. When the current privilege state is a privilege state in which access to a memory location corresponding to the data access address is allowed, access to the memory location is allowed.

Another embodiment of a processing method includes defining a current privilege state as a supervisor state or a user state, and determining whether a next instruction fetch address corresponds to a location within a memory region associated with the current privilege state or within a memory region associated with a different privilege state by comparing the next instruction fetch address with an instruction address range indicator. The instruction address range indicator defines a supervisor code memory region allocated for storing supervisor code and a user code memory region allocated for storing user code. When the next instruction fetch address does not correspond to a location within the memory region associated with the current privilege state, the next computer instruction is allowed to be fetched only when a transition from the current privilege state to the different privilege state is legal.

In a further embodiment, the processing method also includes determining that a data access address is generated by a computer instruction, and when the data access is generated, determining whether the data access address is for a memory location associated with the supervisor state or a memory location associated with the user state by comparing the data access address with a data address range indicator. The data address range indicator defines a third memory region allocated for storing data associated with the supervisor state, and defines a fourth memory region allocated for storing data associated with the user state. When the current privilege state is the supervisor state, access to the memory location is allowed. When the current privilege state is the user state, access to the memory location is allowed only when the data access address is for a memory location within the fourth memory region.

While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A processing system comprising:
   code memory having a first code memory region allocated to first computer instructions associated with a first privilege state, and a second code memory region allocated to second computer instructions associated with a second privilege state;
   a peripheral module that includes a set of protection registers, wherein the set of protection registers includes
      at least one code address register that stores at least one instruction address range indicator, wherein the at least one instruction address range indicator indicates boundaries of the first code memory region and the second code memory region; and
   a processor core that accesses the peripheral module, wherein the processor core includes
      an instruction fetch address register, wherein, prior to each instruction fetch of a set of sequential instruction fetches, the processor core updates an address in the instruction fetch address register to correspond to a next instruction fetch address;
      first circuitry configured to determine, by comparing an address of an instruction fetched from the code memory with the at least one instruction address range indicator in the set of protection registers, whether a current privilege state is the first privilege state or the second privilege state, and
      second circuitry configured to determine, prior to each instruction fetch of the set of sequential instruction fetches, whether the next instruction fetch address corresponds to a first memory location within a code memory region associated with the current privilege state or to a second memory location within a code memory region associated with a different privilege state by comparing the next instruction fetch address in the instruction fetch address register with the at least one instruction address range indicator in the set of protection registers, and when the next instruction fetch address in the instruction fetch address register is not within the code memory region associated with the current privilege state, to allow a next computer instruction stored at the next instruction fetch address to be fetched only when a transition from the current privilege state to the different privilege state is legal.

2. The processing system of claim 1, wherein the first privilege state is a supervisor state having a first privilege level, and the second privilege state is a user state having a second privilege level that is lower than the first privilege level.

3. The processing system of claim 1, wherein:
   the at least one instruction address range indicator defines a supervisor code memory region allocated for storing supervisor code associated with a supervisor state and defines a user code memory region allocated for storing user code associated with a user state, and
   the second circuitry is configured to determine that the next instruction fetch address is within a code memory region associated with the supervisor state when the next instruction fetch address falls within the supervisor code memory region, and the next instruction fetch address is within a code memory region associated with the user state when the next instruction fetch address falls within the user code memory region.

4. The processing system of claim 1, wherein:
   the second circuitry is further configured to produce an execution fault and disallow a computer instruction from being fetched when a transition from the current privilege state to the different privilege state is not legal.

5. A processing method comprising:
   storing, in a peripheral module, at least one instruction address range indicator that defines one or more first code memory regions allocated for storing computer instructions associated with a first privilege state and that defines one or more second code memory regions allocated for storing computer instructions associated with a second privilege state;
   defining a current privilege state as the first privilege state or the second privilege state based on a first address of an instruction fetched from code memory;
   updating, by a processor core, an address in an instruction fetch address register to correspond to a next instruction fetch address prior to each instruction fetch of a set of sequential instruction fetches;
   determining, by the processor core prior to each instruction fetch of the set of sequential instruction fetches, whether the next instruction fetch address in the instruction fetch address register corresponds to a first memory location within a code memory region associated with the current privilege state or to a second memory location within a code memory region associated with a different privilege state by accessing the at least one instruction address range indicator in the peripheral module, and by comparing the next instruction fetch address in the instruction fetch address register with the at least one instruction address range indicator; and
   when the next instruction fetch address in the instruction fetch address register is not within the code memory region associated with the current privilege state, the processor core allowing a next computer instruction stored at the next instruction fetch address to be fetched only when a transition from the current privilege state to the different privilege state is legal.

6. The method of claim 5, wherein the first privilege state is a supervisor state having a first privilege level, and the second privilege state is a user state having a second privilege level that is lower than the first privilege level.

7. The method of claim 5, wherein:
   the at least one instruction address range indicator defines a supervisor code memory region allocated for storing supervisor code associated with a supervisor state and defines a user code memory region allocated for storing user code associated with a user state, and
   the method further comprises determining that the next instruction fetch address is within a code memory region associated with the supervisor state when the next instruction fetch address falls within the supervisor code memory region, and the next instruction fetch address is within a code memory region associated with the user state when the next instruction fetch address falls within the user code memory region.

8. The method of claim 5, further comprising:
   producing an execution fault and disallowing a computer instruction from being fetched when a transition from the current privilege state to the different privilege state is not legal.

9. A processing method comprising:
   storing, in a peripheral module, an instruction address range indicator that defines a supervisor code memory region allocated for storing supervisor code associated with a supervisor state and a user code memory region allocated for storing user code associated with a user state;

defining, by a processor core, a current privilege state as the supervisor state or the user state;

updating, by the processor core, an address in an instruction fetch address register to correspond to a next instruction fetch address prior to each instruction fetch of a set of sequential instruction fetches;

determining, by the processor core prior to each instruction fetch of the set of sequential instruction fetches, whether the next instruction fetch address in the instruction fetch address register corresponds to a first memory location within a code memory region associated with the current privilege state or to a second memory location within a code memory region associated with a different privilege state by accessing the instruction address range indicator in the peripheral module, and by comparing, prior to each instruction fetch of the set of sequential instruction fetches, the next instruction fetch address in the instruction fetch address register with the instruction address range indicator; and when the next instruction fetch address is not within the code memory region associated with the current privilege state, the processor core allowing a next computer instruction stored at the next instruction fetch address to be fetched only when a transition from the current privilege state to the different privilege state is legal.

10. The method of claim 9, wherein:
when the current privilege state is the supervisor state and the different privilege state is the user state, the transition from the supervisor state to the user state is legal when an instruction within a set of instructions is executed, wherein the set of instructions includes a return from interrupt instruction.

11. The method of claim 9, wherein:
when the current privilege state is the user state and the different privilege state is the supervisor state, the transition from the user state to the supervisor state is legal when an instruction within a set of instructions is executed, wherein the set of instructions includes a software interrupt instruction and a trap instruction, or when an exception condition is detected.

12. The method of claim 9, wherein the supervisor state has a first privilege level, and the user state has a second privilege level that is lower than the first privilege level.

13. The method of claim 9, further comprising:
determining that the next instruction fetch address is within a code memory region associated with the supervisor state when the next instruction fetch address falls within the supervisor code memory region, and the next instruction fetch address is within a code memory region associated with the user state when the next instruction fetch address falls within the user code memory region.

14. The method of claim 9, further comprising:
producing an execution fault and disallowing a computer instruction from being fetched when a transition from the current privilege state to the different privilege state is not legal.

* * * * *